(12) United States Patent
Ishioka

(10) Patent No.: US 9,762,345 B2
(45) Date of Patent: Sep. 12, 2017

(54) RECEIVING DEVICE

(71) Applicant: Mitsubishi Electric Corporation, Chiyoda-ku (JP)

(72) Inventor: Kazuaki Ishioka, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/126,383

(22) PCT Filed: Mar. 19, 2015

(86) PCT No.: PCT/JP2015/058344
§ 371 (c)(1),
(2) Date: Sep. 15, 2016

(87) PCT Pub. No.: WO2015/141801
PCT Pub. Date: Sep. 24, 2015

(65) Prior Publication Data
US 2017/0085334 A1    Mar. 23, 2017

(30) Foreign Application Priority Data

Mar. 19, 2014   (JP) ................................ 2014-056711

(51) Int. Cl.
*H04L 25/08*     (2006.01)
*H04J 11/00*     (2006.01)
(Continued)

(52) U.S. Cl.
CPC ........ *H04J 11/0066* (2013.01); *H04B 1/1036* (2013.01); *H04L 27/2605* (2013.01); *H04L 27/2647* (2013.01); *H04B 2001/1054* (2013.01)

(58) Field of Classification Search
CPC . H01Q 3/2611; H04J 11/0023; H04L 27/2691
(Continued)

(56) References Cited

U.S. PATENT DOCUMENTS 7,450,653 B2    11/2008  Abe
2004/0109419 A1   6/2004  Sano et al.
(Continued)

FOREIGN PATENT DOCUMENTS

JP        10-75226 A     3/1998
JP        2002-135230 A  5/2002
(Continued)

OTHER PUBLICATIONS

International Search Report Issued May 26, 2015 in PCT/JP15/058344 Filed Mar. 19, 2015.

*Primary Examiner* — David S Huang
(74) *Attorney, Agent, or Firm* — Oblon, McClelland, Maier & Neustadt, L.L.P.

(57) ABSTRACT

A receiving device according to the present invention is a receiver for receiving a signal including null symbols. The receiver includes a null extraction unit for extracting the null symbols from the received signal, a power calculation unit for calculating a power of each null symbol extracted by the null extraction unit, a two-dimensional filter unit for performing a plurality of kinds of filtering for the powers of the respective null symbols calculated by the power calculation unit and obtaining a plurality of kinds of average power values, and a normalizing unit for normalizing a data symbol included in the received signal based on a value obtained by performing nonlinear processing to the average power values obtained by the two-dimensional filter unit.

4 Claims, 7 Drawing Sheets

(51) Int. Cl.
*H04L 27/26* (2006.01)
*H04B 1/10* (2006.01)

(58) Field of Classification Search
USPC .................................................. 375/346, 350
See application file for complete search history.

(56) References Cited

U.S. PATENT DOCUMENTS

| | | | |
|---|---|---|---|
| 2008/0175330 A1* | 7/2008 | Jeon | H04B 17/345 375/260 |
| 2009/0036071 A1* | 2/2009 | Wang | H01Q 3/2611 455/127.1 |
| 2010/0048151 A1 | 2/2010 | Hara | |
| 2012/0201152 A1 | 8/2012 | Yoo et al. | |
| 2012/0327795 A1 | 12/2012 | Mallik et al. | |
| 2016/0241351 A1 | 8/2016 | Suzuki et al. | |

FOREIGN PATENT DOCUMENTS

| | | |
|---|---|---|
| JP | 2005-229466 A | 8/2005 |
| JP | 2011-234259 A | 11/2011 |
| JP | 4906875 B2 | 3/2012 |
| JP | 2013-539266 A | 10/2013 |
| WO | 2015/045585 A1 | 4/2015 |

\* cited by examiner

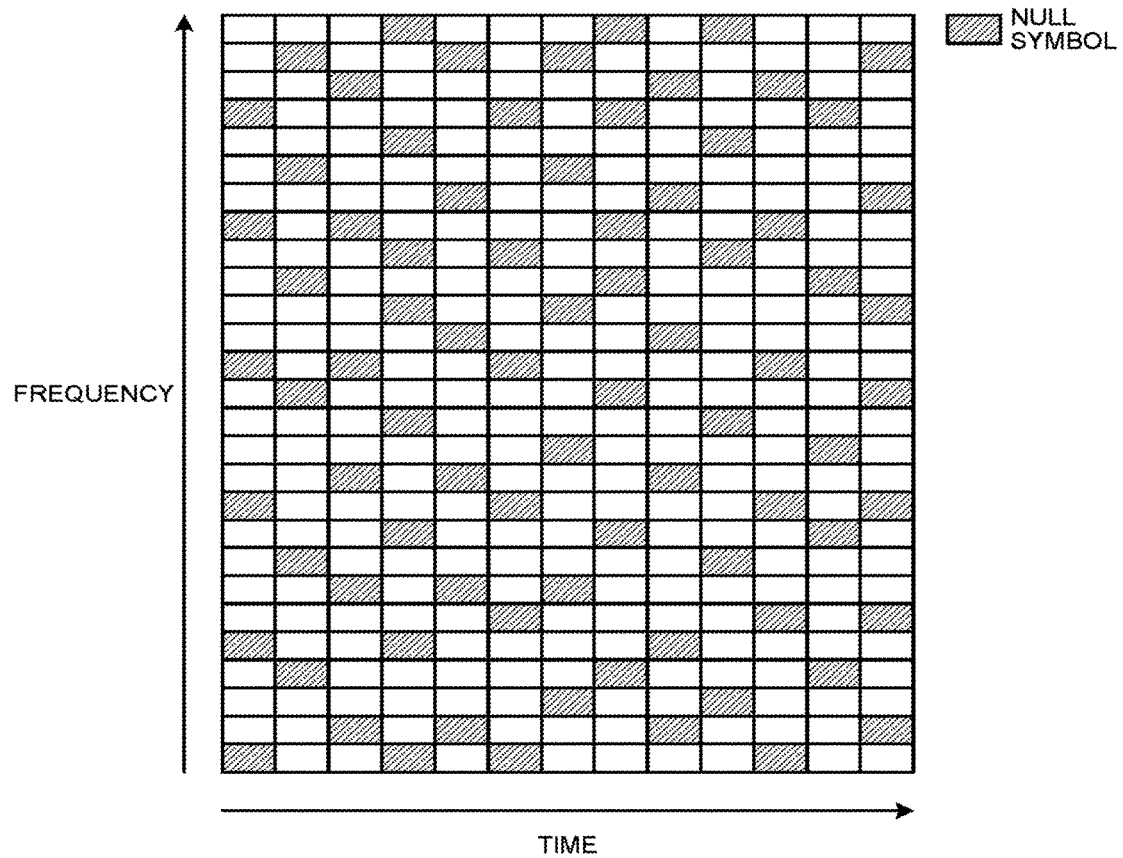

FIG.9

(c) THIRD TWO-DIMENSIONAL FILTER (b) SECOND TWO-DIMENSIONAL FILTER (a) FIRST TWO-DIMENSIONAL FILTER

RECEIVING DEVICE

FIELD

The present invention relates to a receiving device of a radio communication system.

BACKGROUND

A radio communication system that does not need a license in an industry-science-medical (ISM) band has been widely used. A communication quality of the radio communication is deteriorated by receiving interference waves from other communication and other radio system using the same time and the same frequency, an electric apparatus such as a microwave, and an obstructer. Therefore, it is necessary to improve an interference resistance performance. As a method for improving the interference resistance performance, for example, Patent Literature 1 discloses a method for randomly inserting null symbols by using the orthogonal frequency division multiplexing (OFDM) method and measuring an interference power by using the null symbols.

CITATION LIST

Patent Literature

Patent Literature 1: JP 4906075 B1

SUMMARY

Technical Problem

There are various types of interference waves including a narrow-band interference in which a frequency is narrower than a signal bandwidth, a burst interference temporally shorter than a packet length, and an interference, of which a frequency fluctuates, which is a sine wave in a short time such as a microwave. When the type of the interference cannot be previously found, the optimal filtering cannot be performed when the interference power is measured based on the null symbols. Therefore, there has been a problem in that although the receiving device has a high interference resistance performance for a certain type of the interference, the interference resistance performance of the receiving device deteriorates for another type of the interference.

The present invention has been made in consideration of the above. A purpose of the present invention is to obtain a receiving device with high interference resistance performance.

Solution to Problem

In order to solve the problems and achieve the object, according to an aspect of the present invention, there is provided a receiving device for receiving a signal including null symbols, including: a null extraction unit configured to extract null symbols from a received signal; a power calculation unit configured to calculate a power of each null symbol extracted by the null extraction unit; a filter unit configured to perform a plurality of kinds of filtering for the powers of the respective null symbols calculated by the power calculation unit and obtain a plurality of kinds of average power values; and a normalizing unit configured to normalize a data symbol included in the received signal based on a value obtained by performing nonlinear processing to the average power values obtained by the filter unit, wherein the plurality of kinds of filtering that the filter unit is configured to perform is to obtain the average power values for the powers of the respective null symbols.

Advantageous Effects of Invention

According to the present invention, an optimal filtering result according to a kind of interference can be obtained, and receiving performance can be improved.

BRIEF DESCRIPTION OF DRAWINGS

FIG. 5 is a diagram illustrating an exemplary signal in which null symbols are inserted.

FIG. 6 is a diagram illustrating an exemplary weight coefficient as filter characteristics of a two-dimensional filter unit.

FIG. 9 is a diagram illustrating exemplary characteristics (weight coefficient) of a two-dimensional filter.

DESCRIPTION OF EMBODIMENTS

An embodiment of a receiving device according to the present invention is described in detail below with reference to the drawings. The present invention is not limited to the embodiment.

Embodiment

Figure 1:
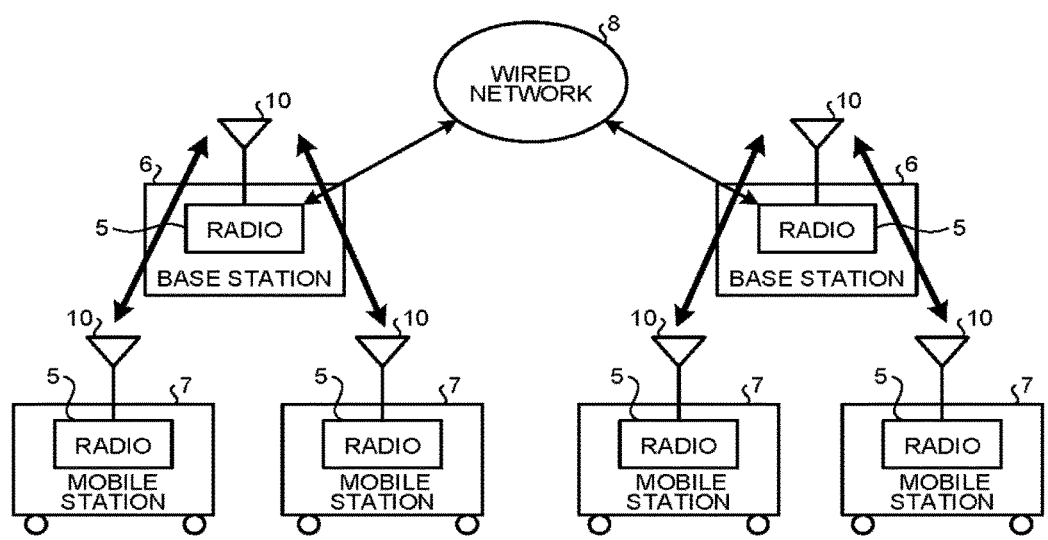
FIG. 1 is a diagram illustrating an exemplary structure of a radio communication system to which a receiving device according to an embodiment of the present invention is applied.

FIG. 1 is a diagram illustrating an exemplary structure of a radio communication system to which a receiving device an embodiment of according to the present invention is applied. The radio communication system includes a plurality of base stations 6 and a plurality of mobile stations 7. Each of the base stations 6 and mobile stations 7 includes a radio 5 and an antenna 10. The plurality of base stations 6 is connected to a wired network 8. The mobile station 7 is, for example, a transportation (mobile body) such as an automobile, a railway vehicle, an aircraft, and a ship to which the radio 5 is mounted. Also, a form may be used in which the person carries the radio 5 similar to that included in the mobile station 7. Although a receiving device is not shown in FIG. 1, the receiving device is included in the radio 5.

The base station 6 is placed in an area referred to as a cell, and the base station 6 communicates with the plurality of mobile stations 7 in the area. The mobile station 7 can communicate with a communication partner on the wired network 8 via the base station 6. When the mobile station 7 moves to the next cell, the communication can be continued by switching the connection to the base station 6.

Figure 2:
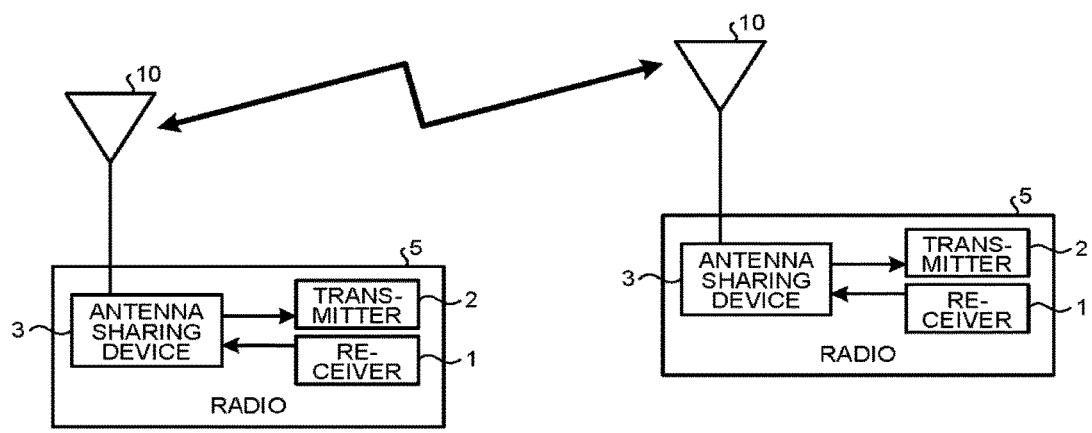
FIG. 2 is a diagram illustrating an exemplary structure of a radio.

FIG. 2 is a diagram illustrating an exemplary structure of the radio 5. As illustrated in FIG. 2, the radio 5 is connected to the antenna 10 and includes a receiver 1, a transmitter 2, and an antenna sharing device 3 therein. In a case of time division share, the antenna sharing device 3 is a switch for switching transmission and reception. In a case of frequency division share, the antenna sharing device 3 is a filter for separating frequencies for transmission and reception. In FIG. 2, two radios 5 for transmitting/receiving a radio signal to/from each other are illustrated. One of the radios 5 is mounted to the base station 6, and another radio 5 is mounted to the mobile station 7.

Figure 3:
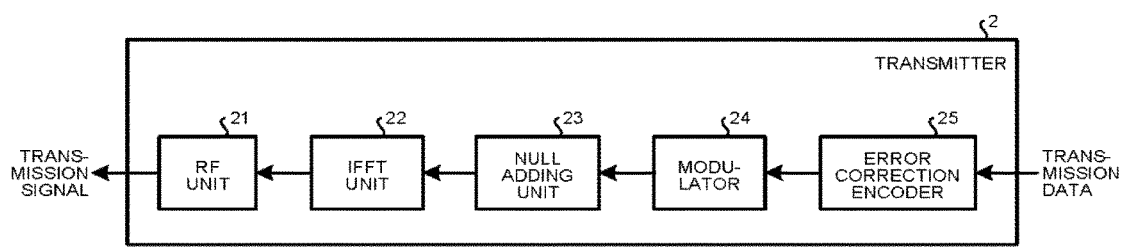
FIG. 3 is a diagram illustrating an exemplary structure of a transmitter.

FIG. 3 is a diagram illustrating an exemplary structure of the transmitter 2. As illustrated in FIG. 3, the transmitter 2 includes a RF unit 21, an IFFT unit 22, a null adding unit 23, a modulator 24, and an error correction encoder 25. In the transmitter 2, the error correction encoder 25 encodes transmission data. The modulator 24 modulates the encoded transmission data according to a modulation system such as the QPSK and the QAM. The error correction encoder 25 may be realized by exclusive hardware and software. When the error correction encoder 25 is realized by the software, for example, the error correction encoder 25 is realized by executing a program to perform as the error correction encoder 25 by a processor such as a central processing unit (CPU) and a system large scale integration (LSI). The null adding unit adds a null to the modulated transmission data, and the IFFT unit 22 performs inverse fast Fourier transform (IFFT) and OFDM modulation to the transmission data to which the null has been added. The RF unit 21 converts the transmission data to which the OFDM modulation has been performed into high-frequency waves and outputs it.

Figure 4:
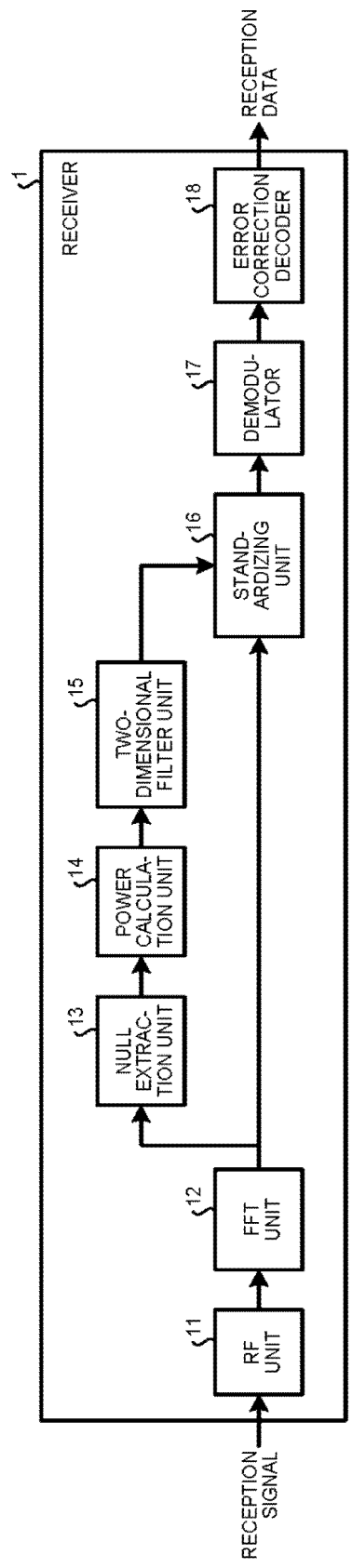
FIG. 4 is a diagram illustrating an exemplary structure of a receiver.

FIG. 4 is a diagram illustrating an exemplary structure of the receiver 1. As illustrated in FIG. 4, the receiver 1 includes a RF unit 11, a FFT unit 12, a null extraction unit 13, a power calculation unit 14, a two-dimensional filter unit 15, a normalizing unit 16, a demodulator 17, and an error correction decoder 18. When the receiver 1 receives a high-frequency wave signal transmitted from the transmitter 2, the RF unit 11 converts the received signal into a baseband signal. Next, the FFT unit 12 disassembles the signal into subcarriers for each OFDM symbol. The null extraction unit 13 extracts a null symbol from the signal (output signal from the FFT unit 12) for each symbol and each OFDM subcarrier, and a power calculation unit 14 calculates a power value $I^2+Q^2$ of a complex number signal (I+Qj) which is the null symbol extracted by the null extraction unit 13. The two-dimensional filter unit 15 averages the power value in a time frequency region. The normalizing unit 16 normalizes a signal part which is not null (data signal part) in the output signal from the FFT unit 12 by using the average power value calculated by the two-dimensional filter unit 15. The signal part is normalized by dividing it by a square root of the power value (average power value output from the two-dimensional filter unit 15). The average power value of the null symbol part is an interference power. A symbol with a large interference power has a small weight so as to reduce interference. At this time, the interference and the signal (data component) are reduced at the same time. However, the signal can be recovered by performing decoding processing by the error correction decoder 18 after the demodulator 17 demodulates the signal output from the normalizing unit 16. The error correction decoder 18 may be realized by exclusive hardware and software. When the error correction decoder 18 is realized by the software, for example, the error correction decoder 18 is realized by executing a program to perform as the error correction decoder 18 by the processor.

Figure 7:
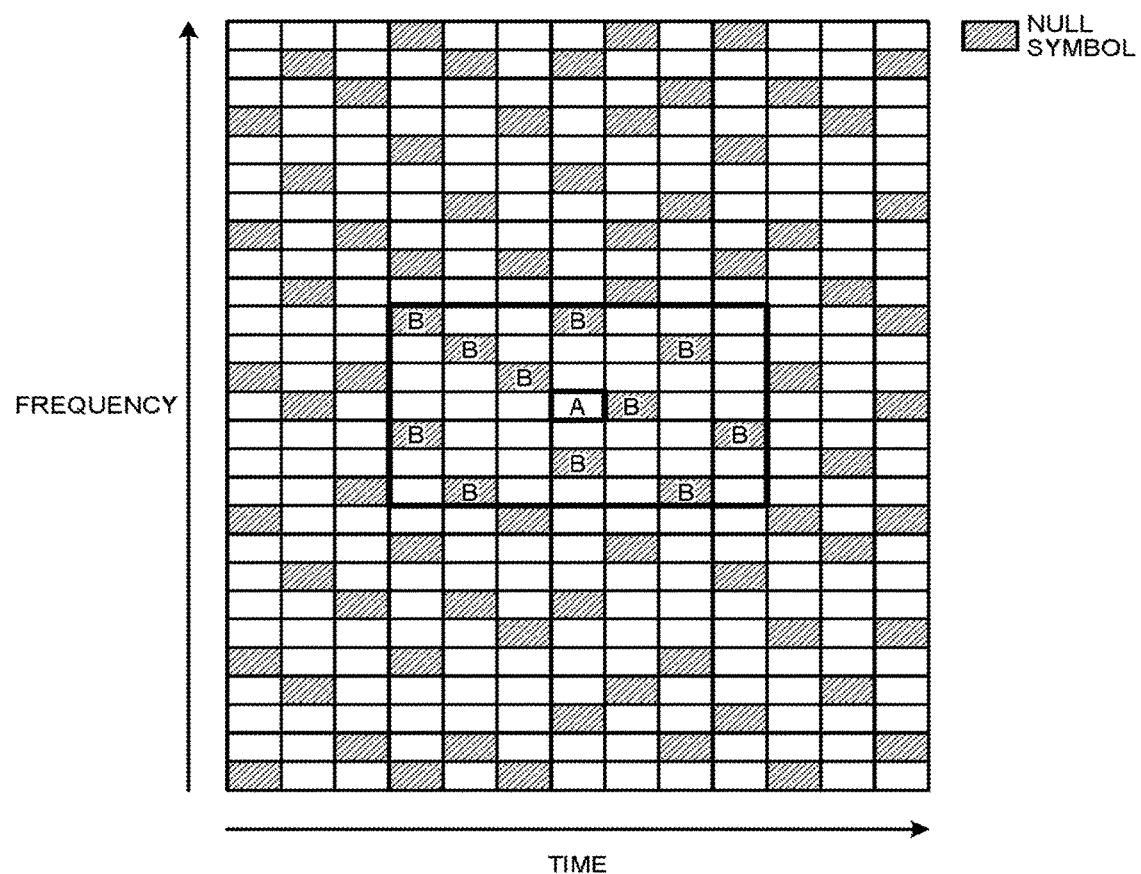
FIG. 7 is a diagram illustrating an exemplary filter operation.

FIG. 5 is a diagram illustrating an exemplar signal to which the null symbols are inserted (added). In a region which is not the null symbol, a signal (data symbol) is transferred. FIG. 6 is a diagram illustrating an exemplary weight coefficient as filter characteristics of the two-dimensional filter unit 15. In FIG. 6, a filter having characteristics in which all the weights in 7×7 time frequency regions are one is illustrated. FIG. 7 is a diagram illustrating an exemplary filter operation in a case where filtering is performed to the signal illustrated in FIG. 5 by using the filter having the characteristics illustrated in FIG. 6. In this example, the interference power at an A point (data symbol to which A is applied) is an average of powers of null points (null symbol to which B is applied) in a 7×7 region having the A point as the center.

Figure 8:
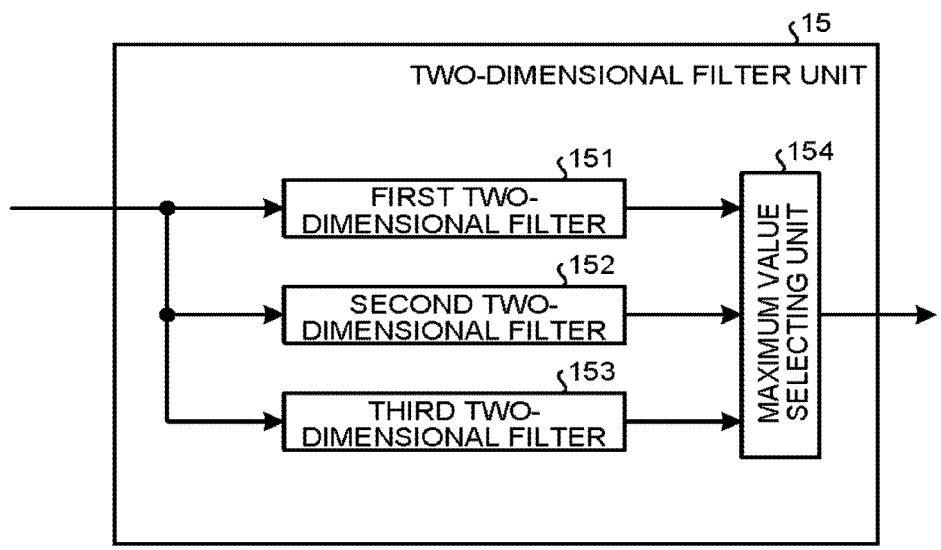
FIG. 8 is a diagram illustrating an exemplary structure of the two-dimensional filter unit.

FIG. 8 is a diagram illustrating an exemplary structure of the two-dimensional filter unit 15. The two-dimensional filter unit 15 includes a first two-dimensional filter 151, a second two-dimensional filter 152, a third two-dimensional filter 153, and a maximum value selecting unit 154. The two-dimensional filters (first two-dimensional filter 151, second two-dimensional filter 152, and third two-dimensional filter 153) have different character tics from each other. The maximum value selecting unit 154 selects the maximum power value from among the power values respectively output from the two-dimensional filters and outputs it. The two-dimensional filters are suitable for different types of interferences. Therefore, the two-dimensional filters can cope with different types of interferences by using the maximum value as the interference power.

FIG. 9 is a diagram illustrating exemplary characteristics (weight coefficient) of each two-dimensional filter. In the examples in FIG. 9, the first two-dimensional filter 151 is an equal-weight filter in a range of 3×15 in the time frequency region, and the second two-dimensional filter 152 is an equal-weight filter in a range of 7×7 in the time frequency region. The third two-dimensional filter 153 is an equal-weight filter in a range of 15×3 in the time frequency region. The first two-dimensional filter 151 has a high time resolution and a low frequency resolution. Therefore, the first two-dimensional filter 151 has high performance for the interference of which time is rapidly fluctuated and low performance for a narrow-band interference. On the other hand, the third two-dimensional filter 153 has a low time resolution and a high frequency resolution. Therefore, the third two-dimensional filter 153 has low performance for the interference of which time is rapidly fluctuated and high performance for the narrow-band interference. The second two-dimensional filter 152 has intermediate characteristics between those of the first two-dimensional filter 151 and the third two-dimensional filter 153. The two-dimensional filter unit 15 outputs the maximum value of the filter output as the filtering result by nonlinear processing so that a high interference resistance performance for a narrow-band interference and a burst interference having rapid time fluctuation can be obtained. A median value can be used for the nonlinear processing other than the maximum value.

In FIG. 8, an exemplary structure of the two-dimensional filter unit 15 including three kinds of two-dimensional filters having different characteristics from each other is illustrated. However, the two-dimensional filter unit 15 may have a structure having four or more kinds of two-dimensional filters and a structure having two kinds of two-dimensional filters.

In this way, the receiving device according to the present embodiment performs the filtering by using the filters having a plurality of different characteristics in two-dimensional filter processing for averaging the powers received by the null symbols in the time frequency region. Also, the receiving device normalizes the data symbol by using the nonlinear processing to the maximum value from among the filtering results. According to this, the optimal filtering result according to the kind of the interference such as the narrow-band interference and the burst interference can be obtained, and the receiving performance can be improved.

The structure illustrated in the above embodiment illustrates an exemplary content of the present invention and can be combined with other known technique. Further, the structure illustrated in the embodiment can be partially omitted and changed without departing from the scope of the present invention.

INDUSTRIAL APPLICABILITY

As described above, a receiving device according to the present invention is useful for a receiving device included in a communication device (base station, mobile station, and the like) for transmitting/receiving a radio signal to which null symbols are inserted.

REFERENCE SIGNS LIST

1 receiver, 2 transmitter, 3 antenna sharing device, 5 radio, 6 base station, 7 mobile station, 8 wired network, 10 antenna, 11, 21 RF unit, 12 FFT unit, 13 null extraction unit, 14 power calculation unit, 15 two-dimensional filter unit, 16 normalizing unit, 17 demodulator, 18 error correction decoder, 22 IFFT unit, null adding unit, 24 modulator, 25 error correction encoder, 151 first two-dimensional filter, 152 second two-dimensional filter, 153 third two-dimensional filter, 154 maximum value selecting unit

The invention claimed is:

1. A receiving device for receiving a signal including null symbols, comprising:
   a null extraction unit configured to extract null symbols from a received signal;
   a power calculation unit configured to calculate a power of each null symbol extracted by the null extraction unit;
   a filter unit configured to perform a plurality of kinds of filtering for the powers of the respective null symbols calculated by the power calculation unit and obtain a plurality of kinds of average power values; and
   a normalizing unit configured to normalize a data symbol included in the received signal based on a value obtained by performing nonlinear processing to the average power values obtained by the filter unit, wherein
   the plurality of kinds of filtering that the filter unit is configured to perform is to obtain the average power values for the powers of the respective null symbols.

2. The receiving device according to claim 1, wherein the filter unit performs filtering in a time frequency region.

3. The receiving device according to claim 1, wherein
   the plurality of kinds of filtering includes filtering to calculate an average power value of an interference component added to the received signal by a narrow-band interference and filtering to calculate an average power value of an interference component added to the received signal by a burst interference.

4. The receiving device according to claim 1, wherein the receiving device is included in a multi-carrier radio transmission system.

* * * * *